United States Patent [19]

Moczygemba et al.

[11] Patent Number: 5,436,298

[45] Date of Patent: Jul. 25, 1995

[54] BLOCK COPOLYMERS OF MONOVINYLARENES AND CONJUGATED DIENES AND PREPARATION THEREOF

[75] Inventors: George A. Moczygemba; Larry L. Nash; William J. Trepka; Craig D. DePorter; Nathan E. Stacy; Ralph C. Farrar; Charles M. Selman, all of Bartlesville, Okla.

[73] Assignee: Phillips Petroleum Company, Bartlesville, Okla.

[21] Appl. No.: 308,240

[22] Filed: Sep. 19, 1994

Related U.S. Application Data

[63] Continuation-in-part of Ser. No. 130,039, Sep. 30, 1993, abandoned.

[51] Int. Cl.[6] .................................. C08F 297/04
[52] U.S. Cl. .................................. 525/314; 525/89; 525/250; 525/271
[58] Field of Search ............ 525/314, 271, 250, 89

[56] References Cited

U.S. PATENT DOCUMENTS

| | | | |
|---|---|---|---|
| 4,131,725 | 12/1978 | Udipi | 526/56 |
| 4,320,188 | 3/1982 | Heinz et al. | 430/281 |
| 4,335,221 | 6/1982 | Gerberding | 525/89 |
| 4,584,346 | 4/1986 | Kitchen | 525/98 |
| 4,704,434 | 11/1987 | Kitchen et al. | 525/250 |
| 4,704,435 | 11/1987 | Kitchen | 525/250 |
| 5,130,377 | 7/1992 | Trepka et al. | 525/314 |
| 5,256,736 | 10/1993 | Trepka et al. | 525/314 |
| 5,270,396 | 12/1993 | Farrar, Jr. et al. | 525/271 |
| 5,290,875 | 3/1994 | Moczygemba et al. | 525/314 |

*Primary Examiner*—James J. Seidleck
*Assistant Examiner*—M. L. Warzel
*Attorney, Agent, or Firm*—Marianne H. Michel

[57] ABSTRACT

A method for preparing resinous polymodal monovinylarene-conjugated diene block copolymers and polymers produced thereby are provided. The method comprises sequentially contacting under polymerization conditions:

(a) a monovinylarene monomer and initiator;
(b) initiator and a monovinylarene monomer;
(c) a sequence of at least two charges selected from the group consisting of (i) initiator and a monovinylarene monomer, (ii) a mixture of monovinylarene monomer and conjugated diene monomer, (iii) a conjugated diene monomer, (iv) a monovinylarene monomer;
(d) s coupling agent;
wherein the sequence of at least two charges in step (c) can be made in any order. In a preferred embodiment, at least three initiator charges are provided. In another preferred embodiment, at east three monovinylarene charges precede the first charge containing conjugated diene. In another preferred embodiment, at least four monovinylarene charges precede the first charge containing conjugated diene.

18 Claims, No Drawings

BLOCK COPOLYMERS OF MONOVINYLARENES AND CONJUGATED DIENES AND PREPARATION THEREOF

This is a continuation-in-part of application Ser. No. 8/130,039 filed Sep. 30, 1993, now abandoned.

FIELD OF THE INVENTION

This invention relates to block copolymers of monovinylarenes and conjugated dienes and methods of preparation of these block copolymers.

BACKGROUND OF THE INVENTION

There has developed in the polymer field, and especially in the packaging and related industries, a need for thermoplastic polymers that can be formed into odorless, colorless, transparent articles having good impact strength and ductility. There are needs for polymers which are useful as single components as well as for use in blends with commonly used polymers to make articles with improved properties. The polymers satisfying these needs should be suitable for use with conventional extrusion, injection and blow molding equipment and also suitable for use in other methods of forming plastics into containers, tubes, films, fibers, and the like.

Much effort has been directed to the preparation of substantially transparent block copolymer resins with a variety of block structures produced by a variety of monomer addition sequences and a variety of coupling agents. Desirable properties and an economic advantage can be obtained by blending many monovinylarene-conjugated diene copolymers with polystyrene polymers. However, because blends of monovinylarene-conjugated diene copolymers with polystyrene polymers often contain unreacted styrene monomer, there is a need for high styrene content thermoplastic polymers which do not have undesirable unreacted styrene monomer while maintaining a good balance of physical and mechanical properties.

Odor caused by presence of unreacted styrene monomer in articles formed from various copolymers and blends of copolymers with polystyrene is a long-standing problem in applications where odorless, colorless materials which also have good impact strength and ductility are desirable. Specific examples include materials for water and food containers.

SUMMARY OF THE INVENTION

It is an object of this invention to provide novel resinous block copolymers of monovinylarene hydrocarbons and conjugated dienes from which can be made transparent articles with an advantageous balance of properties including acceptable impact strength and ductility.

It is another object of this invention to provide novel resinous block copolymers of monovinylarene hydrocarbons and conjugated dienes suitable for use as a replacement for blends of monovinylarene-conjugated diene copolymers with polymers of styrene. Further, it is an object to provide high styrene content resinous block copolymers of monovinylarene hydrocarbons and conjugated dienes which can be used for applications requiring absence of unreacted styrene monomer and from which can be made articles having good impact strength and/or ductility and a good balance of other physical properties.

A further object of this invention is to provide novel processes for making resinous block monovinylarene-conjugated diene copolymers, including copolymers suitable for use in the place of polymer blends.

We have discovered a method of preparing a block copolymer comprising sequentially contacting under polymerization conditions:
 (a) a monovinylarene monomer and initiator;
 (b) initiator and a monovinylarene monomer;
 (c) a sequence of at least two charges selected from the group consisting of
  (i) initiator and a monovinylarene monomer;
  (ii) a mixture of monovinylarene monomer and conjugated diene monomer;
  (iii) a conjugated diene monomer; and
  (iv) a monovinylarene monomer;
 (d) a coupling agent;
 wherein said sequence of at least two charges in step (c) can be made in any order. In a preferred embodiment, at least three initiator charges are provided. In another preferred embodiment, at least three monovinylarene charges precede the first charge containing conjugated diene. In still another preferred embodiment, at least four monovinylarene charges precede the first charge containing conjugated diene.

The polymers of this invention are transparent, colorless resins from which can be made articles with a good balance of properties such as impact strength and/or ductility. Invention polymers with high styrene content can be used as replacements for blends of other monovinylarene-conjugated diene copolymers with polystyrene and have the advantage of having minimal amounts of unreacted styrene monomer.

DETAILED DESCRIPTION OF THE INVENTION

This is a continuation-in-part of application Ser. No. 08/130,039 filed Sep. 30, 1993 the disclosure of which is herein incorporated by reference.

We have discovered novel monovinylarene-conjugated diene block copolymers which can be used neat as a substitute for blends of other monovinylarene-conjugated diene copolymers with polystyrene to produce resins which can be formed into high styrene content articles with low unreacted styrene monomer content and advantageous impact properties and/or ductility.

The polymers of this invention are characterized as resinous non-rubbery block copolymers of at least one conjugated diene with at least one monovinylarene and are prepared so that, when the choice of coupling agent permits, at least a portion of the final product is of a branched, coupled character.

The polymers prepared according to this invention contain from about 55 to about 95, preferably from about 60 to about 95, more preferably from about 65 to about 95, weight percent copolymerized monovinylarene monomer based on the weight of total monomers employed. Correspondingly, the inventive copolymers contain from about 45 to about 5, preferably from about 40 to about 5, and more preferably from about 35 to about 5 weight percent copolymerized conjugated diene monomer based on the total weight of monomers in the copolymer.

Presently preferred when the invention copolymers are used as replacements for blends of other monovinylarene-conjugated diene copolymers with polystyrene, the polymers of this invention contain from about 80 to about 95, more preferably from 80 to 90 weight percent copolymerized monovinylarene monomer based on the weight of total monomers employed. Correspondingly, the inventive copolymers contain from about 20 to about 5, more preferably from about 20 to about 10 weight percent copolymerized conjugated diene monomer based on the total weight of monomers in the copolymer.

Generally, the first monovinylarene monomer charge contains monovinylarene monomer in the amount in the range of from about 30 weight percent to about 50 weight percent based on the total weight of the final block copolymer.

Generally, the second monovinylarene monomer charge contains monovinylarene monomer in the amount in the range of from about 15 weight percent to about 30 weight percent based on the total weight of the final block copolymer.

When employed, the third monovinylarene monomer charge typically contains monovinylarene monomer in the amount in the range of from about 5 weight percent to about 30 weight percent based on the total weight of the final block copolymer.

Under certain circumstances, it is desirable to provide a fourth monovinylarene monomer charge. If a fourth monovinylarene monomer charge is employed, the third and fourth monovinylarene monomer charges each contain monovinylarene monomer in the range of from about 5 weight percent to about 20 weight percent based on the total weight of the final block copolymer.

More particularly, with reference to the Summary of the Invention, the following embodiments are provided comprising or consisting essentially of the following sequences. In one embodiment the sequence of charges is (c) is (i), (ii). In a second embodiment, the sequence of charges in (c) is (ii), (iv). In a third embodiment, the sequence of charges in (c) is (i), (iv), (iii). In a fourth embodiment, the sequence of charges in (c) is (i), (ii), (ii). In a fifth embodiment the sequence of charges in (c) is (ii), (i), (ii). In a sixth embodiment the sequence of charges in (c) is (i), (iii).

COMPONENTS

The process of this invention can be carried out using as an initiator any of the organomonoalkali metal compounds of the formula RM wherein R is an alkyl, cycloalkyl or arylcarbanion containing 4 to 8 carbon atoms and M is an alkyl metal cation. Mixtures of organoalkali metal compounds can be used. The presently preferred initiators are alkylmonolithium compounds, especially n-butyllithium or sec-butyllithium.

The conjugated diene monomers which can be used contain 4 to 6 carbon atoms and include 1,3-butadiene, 2-methyl-1,3-butadiene, 2-ethyl-1,3-butadiene, 2,3-dimethyl-1,3-butadiene and 1,3-pentadiene and mixtures thereof. Each of the charges containing conjugated diene in the same sequence of charges may be the same, but is not necessarily the same, conjugated diene monomer or mixture of conjugated diene monomers. The presently preferred conjugated diene monomer is 1,3-butadiene.

The monovinylarene monomers which can be used contain 8 to 12 carbon atoms and include styrene, alpha-methylstyrene, 4-methylstyrene, 3-methylstyrene, 2-methylstyrene, 4-ethylstyrene, 3-ethylstyrene, 2-ethylstyrene, 4-tert-butylstyrene, 2,4-dimethylstyrene and condensed aromatics such as vinyl naphthalene and mixtures thereof. Each of the charges containing monovinylarene monomer in the same sequence of charges may be the same, but is not necessarily the same, monovinylarene monomer or mixture of monovinylarene monomers. The presently preferred monovinylarene monomer is styrene.

Examples of polar compounds which can be advantageously employed as randomizers and promoters are ethers, thioethers (sulfides) and tertiary amines. It is usually preferred to use ethers and sulfides in which the radicals attached to the oxygen or sulfur atoms are hydrocarbon radicals. It is to be understood also that mixtures of polar compounds can be employed in the practice of the present invention. Presently preferred are either tetrahydrofuran or diethyl ether.

Among the suitable coupling agents are the di- or multivinylarene compounds, di- or multiepoxides, di- or multiisocyanates, di- or multiimines, di- or multialdehydes, di- or multiketones, alkoxytin compounds, di- or multihalides, particularly silicon halides and halosilanes, mono-, di-, or multianhydrides, mono-, di-, or multiesters, preferably the esters of monoalcohols with polycarboxylic acids, diesters which are esters of monohydric alcohols with dicarboxylic acids, lactones, monobasic acids with polyalcohols such as glycerol, and the like, including compounds containing two or more of these groups and mixtures of two or more compounds.

Useful multifunctional coupling agents include epoxidized vegetable oils such as epoxidized soybean oil, epoxidized linseed oil and the like or mixtures thereof.

The presently preferred coupling agent is epoxidized vegetable oil. Presently preferred is epoxidized soybean oil.

PROCESS

The unique polymodal tapered block character of the polymer and good impact strength and/or ductility of articles made from the polymer of a first embodiment of this invention are produced by the unique sequence of an initial charge of monovinylarene monomer and initiator and subsequent addition of two separate sequential charges of initiator and monovinylarene monomer, followed by a separate charge of a mixture of monovinylarene monomer and conjugated diene, and a subsequent coupling step.

The unique polymodal tapered block character of the polymer and good impact strength and/or ductility of articles made from the polymer of a second embodiment of this invention are produced by the unique sequence of an initial charge of monovinylarene monomer and initiator and a subsequent addition of a second charge of initiator and monovinylarene monomer, followed by a separate charge of a mixture of monovinylarene monomer and conjugated diene, which is in turn followed by a charge of monovinylarene monomer, and a subsequent coupling step. Sheet made from such copolymer has a glossy hard surface and has excellent impact resistance.

The unique polymodal block character of the polymer and good impact strength and/or ductility of articles made from the polymer of a third embodiment of this invention are produced by the unique sequence of three sequential charges of monovinylarene monomer and initiator, a subsequent addition of a charge of monovinylarene monomer, followed by a separate charge of a conjugated diene, and a subsequent coupling step.

The unique polymodal tapered block character of the polymer and good impact strength and/or ductility of articles made from the polymer of a fourth embodiment of this invention are produced by the unique sequence of an initial charge of monovinylarene monomer and initiator and subsequent addition of two separate sequential charges of initiator and monovinylarene monomer, followed by two separate sequential charges of a mixture of monovinylarene monomer and conjugated diene, and a subsequent coupling step.

The unique polymodal tapered block character of the polymer and good impact strength and/or ductility of articles made from the polymer of a fifth embodiment of this invention are produced by the unique sequence of an initial charge of monovinylarene monomer and initiator and subsequent addition of a sequential charge of initiator and monovinylarene monomer, followed by a separate charge of a mixture of monovinylarene monomer and conjugated diene, followed by a sequential charge of initiator and monovinylarene monomer, followed by a charge of a mixture of monovinyl monomer and conjugated diene, and a subsequent coupling step.

The unique polymodal tapered block character of the polymer and good impact strength and/or ductility of articles made from the polymer of a sixth embodiment of this invention are produced by the unique sequence of an initial charge of monovinylarene monomer and initiator and subsequent addition of two separate sequential charges of initiator and monovinylarene monomer, followed by a separate charge of conjugated diene, and a subsequent coupling step.

In each of the embodiments of this invention the first initiator charge produces active living monovinylarene component polymer blocks with alkali metal atoms (from the initiator) on at least one end to form active reaction sites. The other ends of each of these polymeric chains will be end-capped with the "organo" portion of the organomonoalkali metal compound used as the initiator, i.e., the R portion of the RM compound. Each subsequent monomer charge adds monomer to the living polymer chain at the alkali metal reaction site. At each stage of charging, polymerization is usually allowed to continue until essentially no free monomer is present.

With each subsequent charge which includes initiator a new polymer-alkali metal species will be produced, and each subsequent monomer charge has an opportunity for polymerization of part of the charge with each of the existing polymer-alkali metal species. After virtually complete polymerization of the final monomer charge, the active living linear block copolymers are charged with a difunctional or polyfunctional coupling agent to below coupling of each of the living species with each of the other living species or with others of the same living species to form the desired polymodal block copolymers. If the coupling agent is not 100 percent efficient and/or if less or more than a stoichiometric amount of coupling agent is used, there can be some uncoupled terminated polymer chains of each of the species in the final reaction mixture.

Use of difunctional coupling agents will produce predominantly linear polymer chains. Depending upon amount and functionality, various degrees and kinds of branching may be accomplished with polyfunctional coupling agents.

The charging sequences of the various embodiments of this invention and the resulting polymers at each stage are exemplified using a selected monovinylarene monomer, conjugated diene and polyfunctional coupling agent in the following Tables 1–4. The "Organo" end caps are disregarded in designation of the terminal blocks because the end caps are so small in relation to the polymer chains that they do not contribute to the properties of the resulting polymodal polymers.

TABLE 1

Invention Charging Sequence (First Embodiment)

| Charge | Contents of Charge | Resulting Polymer Chains |
|---|---|---|
| (a) | randomizer, initiator$_1$ and styrene$_1$ | $S_1$—$Li_1$ |
| (b) | initiator$_2$ and styrene$_2$ | $S_1$—$S_2$—$Li_1$<br>$S_2$—$Li_2$ |
| (c) | initiator$_3$ and styrene$_3$ | $S_1$—$S_2$—$S_3$—$Li_1$<br>$S_2$—$S_3$—$Li_2$<br>$S_3$—$Li_3$ |
| (d) | butadiene$_1$ and styrene$_4$ | $S_1$—$S_2$—$S_3$—$B_1/S_4Li_1$<br>$S_2$—$S_3$—$B_1/S_4$—$Li_2$<br>$S_3$—$B_1/S_4$—$Li_3$ |
| (e) | coupling agent | polymodal tapered block copolymers with styrene terminal blocks | where
S = styrene
B = butadiene
B/S = tapered block of conjugated diene and monovinylarene
Li = residue from a monoalkali metal initiator remaining on the end of the polymerization chain or reaction site prior to termination or coupling.
subscripts = designation of the numerical order in which that particular component was charged or formed.

TABLE 2

Invention Charging Sequence (Second Embodiment)

| Charge | Contents of Charge | Resulting Polymer Chains |
|---|---|---|
| (a) | randomizer, initiator$_1$ and styrene$_1$ | $S_1$—$Li_1$ |
| (b) | initiator$_2$ and styrene$_2$ | $S_1$—$S_2$—$Li_1$<br>$S_2$—$Li_2$ |
| (c) | butadiene$_1$ and styrene$_3$ | $S_1$—$S_2$—$B_1/S_3$—$Li_1$<br>$S_2$—$B_1/S_3$—$Li_2$ |
| (d) | styrene$_4$ | $S_1$—$S_2$—$B_1/S_3$—$S_4$—$Li_1$<br>$S_2$—$B_1/S_3$—$S_4$—$Li_2$ |
| (e) | coupling agent | polymodal tapered block copolymers with styrene terminal blocks | where
S = styrene
B = butadiene
B/S = tapered block of conjugated diene and monovinylarene
Li = residue from a monoalkali metal initiator remaining on the end of the polymerization chain or reaction site prior to termination or coupling.
subscripts = designation of the numerical order in which that particular component was charged or formed.

TABLE 3

Invention Charging Sequence (Third Embodiment)

| Charge | Contents of Charge | Resulting Polymer Chains |
|---|---|---|
| (a) | randomizer, initiator$_1$ and styron$_1$ | $S_1$—$Li_1$ |
| (b) | initiator$_2$ and styrene$_2$ | $S_1$—$S_2$—$Li_1$<br>$S_2$—$Li_2$ |
| (c) | initiator$_3$ and styrene$_3$ | $S_1$—$S_2$—$S_3$—$Li_1$<br>$S_2$—$S_3$—$Li_2$<br>$S_3$—$Li_3$ |
| (d) | styrene$_4$ | $S_1$—$S_2$—$S_3$—$S_4$—$Li_1$<br>$S_2$—$S_3$—$S_4$—$Li_2$<br>$S_3$—$S_4$—$Li_3$ |
| (e) | butadiene$_1$ | $S_1$—$S_2$—$S_3$—$S_4$—$B_1$—$Li_1$<br>$S_2$—$S_3$—$S_4$—$B_1$—$Li_2$<br>$S_3$—$S_4$—$B_1$—$Li_3$ |
| (f) | coupling agent | polymodal block copolymers with styrene |

TABLE 3-continued

Invention Charging Sequence
(Third Embodiment)

| Charge | Contents of Charge | Resulting Polymer Chains |
|---|---|---|
| | | terminal blocks | where
S = styrene
B = butadiene
Li = residue from a monoalkali metal initiator remaining on the end of the polymerization chain or reaction site prior to termination or coupling.
subscripts = designation of the numerical order in which that particular component was charged or formed.

TABLE 4

Invention Charging Sequence
(Fourth Embodiment)

| Charge | Contents of Charge | Resulting Polymer Chains |
|---|---|---|
| (a) | randomizer, initiator$_1$ and styrene$_1$ | $S_1$—Li$_1$ |
| (b) | initiator$_2$ and styrene$_2$ | $S_1$—$S_2$—Li$_1$ <br> $S_2$—Li$_2$ |
| (c) | initiator$_3$ and styrene$_3$ | $S_1$—$S_2$—$S_3$—Li$_1$ <br> $S_2$—$S_3$—Li$_2$ <br> $S_3$—Li$_3$ |
| (d) | butadiene$_1$ and styrene$_4$ | $S_1$—$S_2$—$S_3$—$B_1/S_4$—Li$_1$ <br> $S_2$13 $S_3$—$B_1/S_4$—Li$_2$ <br> $S_3$—$B_1/S_4$—Li$_3$ |
| (e) | butadiene$_2$ and styrene$_5$ | $S_1$—$S_2$—$S_3$—$B_1/S_4$—$B_2/S_5$—Li$_1$ <br> $S_2$—$S_3$—$B_1/S_4$—$B_2/S_5$—Li$_2$ <br> $S_3$—$B_1/S_4$—$B_2/S_5$—Li$_3$ |
| (f) | coupling agent | polymodal tapered block copolymers with styrene terminal blocks | where
S = styrene
B = butadiene
B/S = tapered block of conjugated diene and monovinylarene
Li residue from a monoalkali metal initiator remaining on the end of the polymerization chain or reaction site prior to termination or coupling.
subscripts = designation of the numerical order in which that particular component was charged or formed.

Fifth Embodiment Sequence;
(a) initiator and monovinylarene monomer,
(b) initiator and monovinylarene monomer,
(c) conjugated diene monomer/monovinylarene monomer mixture,
(d) initiator and monovinylarene monomer,
(e) conjugated diene monomer/monovinylarene monomer mixture, and
(f) coupling agent.
Resulting Polymer Chains

| $S_1$—$S_2$—$B_1/S_3$—$S_4$—$B_2/S_5$—Li <br> $S_2$—$B_1/S_3$—$S_4$—$B_2/S_5$—Li <br> $S_4$—$B_2/S_5$—Li |
|---| where
S = styrene
B = butadiene
B/S = tapered block
Li = residue from a monoalkali metal initiator remaining on the end of the polymerization chain or reaction site prior to termination or coupling.
subscripts = designation of the numerical order in which that particular component was charged or formed.

Sixth Embodiment Sequence;
(a) initiator and monovinylarene monomer,
(b) initiator and monovinylarene monomer,
(c) initiator and monovinylarene monomer,
(d) conjugated diene monomer, and
(e) coupling agent.
Resulting Polymer Chains

| $S_1$—$S_2$—$S_3$—$B_1$—Li <br> $S_2$—$S_3$—$B_1$—Li <br> $S_3$—$B_1$—Li |
|---| where
S = styrene
B = butadiene
Li = residue from a monoalkali metal initiator remaining on the end of the polymerization chain or reaction site prior to termination or coupling.
subscripts = designation of the numerical order in which that particular component was charged or formed.

In each of the embodiments the randomizer is usually added with the hydrocarbon diluent initially charged to the reactor. Each of the charges which has two monomers may be either a mixture of the two monomers or simultaneous charging of two separate monomers.

As can be seen from the intermediate products listed in the charging sequence tables above, in each of the embodiments of the invention there are at least two distinct species of polymer chains before coupling. The first and third through sixth embodiments have at least three distinct species of polymer chains before coupling. Thus, polymodal block copolymers comprising various proportions of relatively high, intermediate and low molecular weight species can be produced.

Tapered blocks in each of the growing polymer chains of embodiments having tapered blocks are produced by simultaneously charging with at least two monomers as shown in the preceeding tables of the inventive charging sequences. The randomizer regulates tapering or random polymerization of the monovinylarene monomer and the conjugated diene in a mixed monomer charge. Choice of randomizer can be used to manipulate the degree and direction of taper in blocks resulting from charges of mixtures of monomers. The taper can be either a graduation from conjugated diene rich chain to monovinylarene rich chain or a graduation from a monovinylarene rich chain to conjugated diene rich chain according to preference of the initiator-randomizer complex for one type of monomer over the other.

The weight ratio of monovinylarene monomer to conjugated diene monomer in each of the tapered blocks is from about 1:0.63 to about 1:2, preferably from about 1:0.67 to about 1:1.8, and more preferably from about 1:0.8 to about 1:1.5. In the fourth embodiment, the weight ratios of monovinylarene monomer to conjugated diene monomer in each of the tapered blocks in the same polymer chain do not have to be the same.

The polymerization process is carried out in a hydrocarbon diluent at any suitable temperature in a range of about −10° to about 150° C., preferably in the range of about 0° to about 110° C., at pressures sufficient to maintain the reaction mixture substantially in the liquid phase. Charges of monomer and initiator are made in the presence of an amount of diluent or solvent sufficient to prevent excessive heat of reaction. Temperatures and pressures will peak during polymerization of each monomer charge and then decrease when essentially no free monomer is left to react. Appropriate hydrocarbon diluents include linear and cycloparaffins such as butane, pentane, hexane, octane, cyclohexane, cyclopentane and mixtures thereof. Presently preferred is cyclohexane. Generally the choice of hydrocarbon or hydrocarbon mixture and the temperature is such that the resulting polymer is in solution.

Small amounts of polar compounds are used to improve the effectiveness of alkylmonoalkali metal initiators such as n-butyllithium; dissociation of the alkylmonoalkali metal initiators affects the rate of initiation and polymerization. The polar compounds also effect partial randomization of the vinylarene/conjugated diene so as to increase the random portion of the tapered block. The polar compounds are generally used in admixture with the hydrocarbon diluent.

The amounts of polar compounds used as randomizers and promoters of effectiveness of initiators in this invention will vary according to the reactivity and effectiveness of the particular randomizer used. The amounts of polar compounds used as randomizers will also vary according to the desired molecular structure of the portions of tapered blocks which result from conjugated diene addition. For example, when using tetrahydrofuran, and polymers with higher vinyl character resulting from 1,2 addition in excess of 1,4 addition are desired, larger amounts of tetrahydrofuran are used. However, use of too much randomizer can result in excessive polymer-lithium termination during polymerization and/or poor stability of the polymer and/or undesired side reactions, depending upon choice of randomizer. Use of too little randomizer would result in inefficient initiator use, compositional variations and broader molecular weight distribution.

The initial monovinylarene charge is made with the randomizer present for the additional effect of causing the monovinylarene component resulting from each initiator charge to be of relatively narrow molecular weight distribution. In each of the embodiments of this invention, by varying the amounts of initiator in each of the charges having initiator, the differences in molecular weights of the monovinylarene components resulting from each of these charges can be increased.

In each of the embodiments of the invention, amounts of initiator employed are those which will produce resins with desirable melt flow which can be used to make articles with a good balance of properties including minimal blueness, and good impact strength and/or ductility. Presently preferred when making invention polymers to be used as replacements for blends of other block copolymers with polystyrene are amounts of initiator in each of the initiator charges sufficient to obtain a block copolymer having a melt flow in the range from about 2 to about 50 g/10 minutes, more preferably from about 4 to about 30 g/10 minutes, and most preferably from about 7 to about 20 g/10 minutes, as determined by ASTM D1238-73, condition 200° C./5.0 kg. The amounts of initiator contemplated as useful in each of the charges having initiator are shown in Tables 5 though 8.

Use of too small an amount of initiator would result in high molecular weight polymers. Conversely, use of too large an amount of initiator would result in polymers having short chain polymeric species and low molecular weight.

Varying the weight ratios of amounts of each of the initiator charges made in each polymerization will result in variations of the proportionate amounts of species present in the copolymer. Other factors affecting the proportionate amounts of species present in the copolymer include presence of impurities and/or scavengers in the reactor, effectiveness of the polar randomizer as a promoter and choice of coupling agent(s).

In any of the embodiments of this invention it is feasible to stretch out over an interval of time the addition of one or more of the increments of initiator, thus spreading (increasing) further the polymodality of the resulting product upon coupling.

The polymerization is carried out in a substantial absence of oxygen and water, preferably under an inert gas atmosphere. Prior to the coupling step, the reaction mass contains a very high percentage of molecules (polymer chains) in which an alkali metal cation is positioned at one end of each polymer chain. Impurities in the feed such as water or alcohol reduce the amounts of monoalkali metal polymer in the reaction mass.

After essentially complete polymerization of the final charge added to the polymer, one or more suitable difunctional or polyfunctional coupling agents is added. As used here, the term "coupling" means the bringing together and joining, by means of one or more central coupling atoms or coupling moieties, two or more of the living monoalkali metal-terminated polymer chains.

Any effective amount of the coupling agent can be employed. While the amount is not believed to be particularly critical, a stoichiometric amount relative to the active polymer-alkali metal tends to promote maximum coupling as a generality. Presently preferred is an amount of coupling agent slightly greater than stoichiometric relative to the active polymer-alkali metal. However, less than stoichiometric amounts can be used for higher degrees of coupling where desired for particular products of broadened molecular weight distribution.

Typically, in each of the embodiments of this invention, the total amount of coupling agent is in the range of about 0.005 to 10 phm (parts per 100 parts of total monomers employed in the polymerization). Preferred when most combinations of monomers and coupling agents are used to practice this invention is about 0.2 to about 0.6 phm of coupling agent, depending on amounts of initiator used. Presently most preferred is about 0.3 to about 0.5 phm, depending upon amounts of initiator used. Use of an insufficient amount of coupling agent will result in less complete coupling of the living polymer chains or, depending upon choice of coupling agent, more branching; use of an excessive amount of coupling agent will also result in more uncoupled chains.

At the conclusion of the coupling process, the coupled polymer may still contain bound polymeric alkali metal alkoxides depending on the type of coupling agent employed. The system is treated with an active compound such as water, alcohol, phenols, carbon dioxide or linear saturated aliphatic mono- and dicarboxylic acids to remove any remaining alkali metal from the copolymer chain.

Stabilization agents can be added to provide oxidative stability for the polymer during processing and handling and subsequent long term use by the customer. Commonly used stabilization processes can use a combination of compounds which include, but are not limited to, a hindered phenol and an organophosphite, particular examples of which are octadecyl 3-(3',5'-di-t-butyl-4'-hydroxyphenyl) propionate and tris-nonylphenylphosphite.

After stabilization, the hydrocarbon diluent is then flashed from the polymer solution to increase the solids content. Flashing of the polymer cement may be followed by desolventizing extrusion with vacuum in commercial production or by other vacuuming processes to achieve consistent solvent content of less than 0.3 weight percent.

The resinous copolymeric products can be, and normally are, compounded with anti-oxidants, anti-blocking agents, release agents and other additives, as known in the compounding arts.

Typical charging sequences and useful ranges of amounts of the charges for each of the first four embodiments of this invention are given in Tables 5 through 8. The amounts of initiator and randomizer indicated in the Table for each charge are also appropriate for the fifth and sixth embodiments.

TABLE 5

Ranges of Amounts of Components in a Typical Invention Charging Sequence[a] (First Embodiment)

| Step | Component | Broad Range[b] | Preferred Range[b] | More Preferred Range[b] |
|---|---|---|---|---|
| (a) | randomizer[c] | 0.001–3.0 | 0.01–1.0 | 0.02–0.5 |
|  | initiator and | 0.001–0.20 | 0.005–0.10 | 0.01–0.07 |
|  | monovinylarene monomer | 32–48 | 35–45 | 38–42 |
| (b) | initiator and | 0.001–0.20 | 0.005–0.10 | 0.01–0.07 |
|  | monovinylarene monomer | 12–28 | 15–25 | 18–22 |
| (c) | initiator and | 0.001–0.20 | 0.005–0.15 | 0.01–0.12 |
|  | monovinylarene monomer | 6–14 | 8–12 | 9–11 |
| (d) | monovinylarene monomer and | 5–25 | 10–20 | 13–17 |
|  | conjugated diene monomer | 5–25 | 10–20 | 13–17 |
| (e) | coupling agent | 0.15–0.35 | 0.18–0.32 | 0.20–0.30 |

[a]Monomers within each charge having more than one monomer can be added simultaneously or as a mixture, slowly or quickly. Randomizer in charge (a) may be already present in the diluent or added as a separate charge.
[b]Ranges of amounts are given in parts by weight per 100 parts by weight of total monomers (phm).
[c]To achieve high vinyl content, up to 3 phm randomizer may be used.

TABLE 6

Ranges of Amounts of Components in a Typical Invention Charging Sequence[a] (Second Embodiment)

| Step | Component | Broad Range[b] | Preferred Range[b] | More Preferred Range[b] |
|---|---|---|---|---|
| (a) | randomizer[c] | 0.001–3.0 | 0.01–1.0 | 0.02–0.5 |
|  | initiator and | 0.001–0.20 | 0.005–0.10 | 0.01–0.07 |
|  | monovinylarene monomer | 32–48 | 35–45 | 38–42 |
| (b) | initiator and | 0.001–0.20 | 0.005–0.10 | 0.01–0.07 |
|  | monovinylarene monomer | 12–28 | 15–25 | 18–22 |
| (c) | initiator and | 0.001–0.20 | 0.005–0.15 | 0.01–0.12 |
|  | monovinylarene monomer | 6–14 | 8–12 | 9–11 |
| (d) | monovinylarene monomer and | 6–14 | 8–12 | 9–11 |
| (e) | coupling agent | 0.15–0.35 | 0.18–0.32 | 0.20–0.30 |

[a]Monomers within each charge having more than one monomer can be added simultaneously or as a mixture, slowly or quickly. Randomizer in charge (a) may be already present in the diluent or added as a separate charge.
[b]Ranges of amounts are given in parts by weight per 100 parts by weight of total monomers (phm).
[c]To achieve high vinyl content, up to 3 phm randomizer may be used.

TABLE 7

Ranges of Amounts of Components in a Typical Invention Charging Sequence[a] (Third Emobndiment)

| Step | Component | Broad Range[c] | Preferred Range[c] | More Preferred Range[c] |
|---|---|---|---|---|
| (a) | randomizer[c] | 0.001–3.0 | 0.01–1.0 | 0.02–0.5 |
|  | initiator and | 0.001–0.20 | 0.005–0.10 | 0.01–0.07 |
|  | monovinylarene monomer | 32–48 | 35–45 | 38–42 |
| (b) | initiator and | 0.001–0.20 | 0.005–0.10 | 0.01–0.07 |
|  | monovinylarene monomer | 12–28 | 15–25 | 18–22 |
| (c) | initiator | 0.001–0.20 | 0.005–0.15 | 0.01–0.12 |

TABLE 7-continued

Ranges of Amounts of Components in a Typical Invention Charging Sequence[a]
(Third Emobodiment)

| Step | Component | Broad Range[c] | Preferred Range[c] | More Preferred Range[c] |
|---|---|---|---|---|
| | and monovinylarene monomer | 6–14 | 8–12 | 9–11 |
| (d) | monovinylarene monomer and | 5–25 | 10–20 | 13–17 |
| | conjugated diene monomer | 5–25 | 10–20 | 13–17 |
| (e) | coupling agent | 0.15–0.70 | 0.18–0.60 | 0.20–0.50 |

[a]Monomers within each charge having more than one monomer can be added simultaneously or as a mixture, slowly or quickly. Randomizer in charge (a) may be already present in the diluent or added as a separate charge.
[b]Ranges of amounts are given in parts by weight per 100 parts by weight of total monomers (phm).
[c]To achieve high vinyl content, up to 3 phm randomizer may be used.

TABLE 8

Ranges of Amounts of Components in a Typical Invention Charging Sequence[a]
(Fourth Embodiment)

| Step | Component | Broad Range[b] | Preferred Range[b] | More Preferred Range[b] |
|---|---|---|---|---|
| (a) | randomizer[c] | 0.001–3.0 | 0.01–1.0 | 0.02–0.5 |
| | initiator and | 0.001–0.20 | 0.005–0.10 | 0.01–0.07 |
| | monovinylarene monomer | 32–48 | 35–45 | 38–42 |
| (b) | initiator and | 0.001–0.20 | 0.005–0.10 | 0.01–0.07 |
| | monovinylarene monomer | 12–28 | 15–25 | 18–22 |
| (c) | initiator and | 0.001–0.20 | 0.005–0.15 | 0.01–0.12 |
| | monovinylarene monomer | 10–25 | 12–20 | 14–18 |
| (d) | monovinylarene monomer and | 2–10 | 3–7 | 4–6 |
| | conjugated diene monomer | 2–10 | 3–7 | 4–6 |
| (e) | monovinylarene monomer and | 3–12 | 5–9 | 6–8 |
| | conjugated diene monomer | 3–12 | 5–9 | 6–8 |
| (f) | coupling agent | 0.15–0.70 | 0.18–0.60 | 0.20–0.50 |

[a]Monomers within each charge having more than one monomer can be added simultaneously or as a mixture, slowly or quickly. Randomizer in charge (a) may be already present in the diluent or added as a separate charge.
[b]Ranges of amounts are given in parts by weight per 100 parts by weight of total monomers (phm).
[c]To achieve high vinyl content, up to 3 phm randomizer may be used.

After coupling at least the coupled and uncoupled polymeric species shown in Tables 9 through 12 are present in the polymodal polymers of the first through fourth embodiments, respectively, of this invention.

TABLE 9

Polymeric Species Included in First Embodiment $S_1—S_2—S_3—B_1/S_4\text{-}x\text{-}S_4/B_1—S_3—S_2—S_1$
$S_2—S_3—B_1/S_4\text{-}x\text{-}S_4/B_1—S_3—S_2$
$S_3—B_1/S_4\text{-}x\text{-}S_4/B_1—S_3$
$S_1—S_2—S_3—B_1/S_4\text{-}x\text{-}S_4/B_1—S_3—S_2$
$S_1—S_2—S_3—B_1/S_4\text{-}x\text{-}S_4/B_1—S_3$
$S_2—S_3—B_1/S_4\text{-}x\text{-}S_4/B_1—S_3$
$S_1—S_2—S_3—B_1/S_4$
$S_2—S_3—B_1/S_4$
$S_3—B_1/S_4$ S = monovinylarene block
B = conjugated diene block
B/S = tapered block of conjugated diene and monovinylarene
x = coupling moiety or coupling site
subscripts = indications of the charges which were the source of the polymer blocks.

TABLE 10

Polymeric Species Included in Second Embodiment $S_1—S_2—B_1/S_3—S_4\text{-}x\text{-}S_4—S_3/B_1—S_2—S_1$
$S_1—S_2—B_1/S_3—S_4\text{-}x\text{-}S_4—S_3/B_1—S_2$

TABLE 10-continued

Polymeric Species Included in Second Embodiment $S_2—B_1/S_3—S_4\text{-}x\text{-}S_4—S_3/B_1—S_2$
$S_2—B_1/S_3—S_4$
$S_1—S_2—B_1/S_3—S_4$ S = monovinylarene block
B = conjugated diene block
B/S = tapered block of conjugated diene and monovinylarene
x = coupling moiety or coupling site
subscripts = indications of the charges which were the source of the polymer blocks.

TABLE 11

Polymeric Species Included in Third Embodiment $S_1—S_2—S_3—S_4—B_1\text{-}x\text{-}B_1—S_4—S_3—S_2—S_1$
$S_2—S_3—S_4—B_1\text{-}x\text{-}B_1—S_4—S_3—S_2$
$S_3—S_4—B_1\text{-}x\text{-}B_1—S_4—S_3$
$S_1—S_2—S_3—S_4—B_1\text{-}x\text{-}B_1—S_4—S_3—S_2$
$S_1—S_2—S_3—S_4—B_1\text{-}x\text{-}B_1—S_4—S_3$
$S_2—S_3—S_4—B_1\text{-}x\text{-}B_1—S_4—S_3$
$S_1—S_2—S_3—S_4—B_1$
$S_2—S_3—S_4—B_1$

TABLE 11-continued
Polymeric Species Included in Third Embodiment $S_3-S_4-B_1$ S = monovinylarene block
B = conjugated diene block
x = coupling moiety or coupling site
subscripts = indications of the charges which were the source of the polymer blocks.

TABLE 12
Polymeric Species Included in Fourth Embodiment $S_1-S_2-S_3-B_1/S_4-B_2/S_5\text{-x-}S_5/B_2-S_4/B_1-S_3-S_2-S_1$
$S_2-S_3-B_1/S_4-B_2/S_5\text{-x-}S_5/B_2-S_4/B_1-S_3-S_2$
$S_3-B_1/S_4-B_2/S_5\text{-x-}S_5/B_2-S_4/B_1-S_3$
$S_1-S_2-S_3-B_1/S_4-B_2/S_5\text{-x-}S_5/B_2-S_4/B_1-S_3-S_2$
$S_1-S_2-S_3-B_1/S_4-B_2/S_5\text{-x-}S_5/B_2-S_4/B_1-S_3$
$S_2-S_3-B_1/S_4-B_2/S_5\text{-x-}S_5/B_2-S_4/B_1-S_3$
$S_1-S_2-S_{13}B_1/S_4-B_2/S_5$
$S_2-S_3-B_1/S_4-B_2/S_5$
$S_3B_1/S_4-B_2/S_5$ S = monovinylarene block
B = conjugated diene block
B/S = tapered block of conjugated diene and monovinylarene
x = coupling moiety or coupling site
subscripts = indications of the charges which were the source of the polymer blocks.

In each of the embodiments, depending upon choice and amount of coupling agent or agents and whether coupling agents are charged as a mixture or incrementally, there can be present other polymeric species with varying degrees of branching.

BLENDS

The resinous polymodal copolymer products of this invention can be blended with other polymers such as polystyrene, acrylonitrile-butadiene-styrene copolymers (ABS), styrene-acrylonitrile copolymers (SAN), and other styrene copolymers. When less transparency is desired or transparency is not necessary, the invention copolymers can be blended with high impact polystyrene (HIPS) or polyolefins and/or olefin copolymers.

The compositions of this invention or blends thereof can be extruded, thermoformed, injection molded, blow molded, or made into films or sheets. The compositions of this invention can be used as high styrene content copolymer substitutes for blends of polystyrene with other monovinylarene-conjugated diene block copolymers in making articles with essentially no styrene monomer content. Non-inventive blends typically have 100–300 ppm residual styrene. Articles made from the compositions of this invention are transparent with low blueness, have good impact strength and have other physical properties within acceptable ranges for such applications as drinking cups, lids, bottles, other food containers, medical drainage units, shrink wrap and over-wrap.

TEST PROCEDURES

The blueness values (tristumulus value "b") were determined on a Model D 25 Hunter Lab Color Difference Meter using the Hunter Lab procedure. Blueness values are a measure of blue tint expressed as −b, where larger absolute numbers indicate more blueness. Generally, test specimens which exhibited −7.5 Hunter b blueness or less blueness were considered to have "low blueness". In each example, reported blueness (Hunter "b") values for injection molded test specimens are for the average of three readings on three stacked 0.050" by 2.5" diameter injection molded disks. Disks were injection molded at 350° F./30 tons/2 minutes. Measurements were made against a black background.

Impact characterization of the extruded sheets was done using an Elmendorf Tearing Tester (Thwing-Albert Instrument Co.) in a manner similar to Spencer Impact Testing defined by ASTM D 3420. However, since the 4" sheet width was not sufficient to fill the entire sample clamp, the values were considered to be only relative. A ⅜" diameter tip was used with a 3200 g weight in place. The orientation of the sheet was such that the sheet machine direction was parallel to pendulum swing plane. The convex side of the sheet was up in all tests. Reported impact values are the average of five tests on the sheet and are considered, unitless because of the relative nature of results of the test procedure used.

Other properties were tested using ASTM procedures as shown in Table 13.

TABLE 13
Test Procedures Used

| Property | ASTM Method |
|---|---|
| Flow rate, g/10 min Condition 200° C./5.0 kg | D 1238-88 |
| Haze, % | D 1003-61 (1990) |
| Transmittance, % | D 1003-61 (1990) |
| Shore D hardness | D 2240-91 |
| Tensile strength at yield and break, MPa | D 638-91 at 50 mm/min Type I test specimens |
| Elongation at yield and break, % | D 638-91 at 50 mm/min |
| Flexural modulus, MPa | D 790-86 |
| Flexural strength, MPa | D 790-86 |
| Izod impact strength, notched, J/m | D 256-88 |
| Vicat softening point, °C. | D 1525-91 |
| Total energy dart drop, J | D 4272-85 |

EXAMPLES

The following examples will describe in more detail the experimental process used and the polymodal block copolymers with vinylarene terminal blocks obtained as a result of invention processes. These examples should be taken as illustrative and not restrictive.

Styrene and butadiene were chosen as monomers to exemplify the invention, and randomizer, initiator, coupling agent and diluent appropriate for these monomers were used.

Example I

This example describes two invention polymerization runs (1, 2) which were made to exemplify the first embodiment of the invention. Polymerization was carried out in a stirred, 100-gallon carbon steel reactor with internal cooling coils. Sequential polymerizations were conducted under nitrogen employing essentially anhydrous reactants and conditions. Approximately 152 kg cyclohexane solvent (168.9 phm) were charged to the reactor. The tetrahydrofuran (THF) randomizer/promoter was in solution in the cyclohexane solvent initially charged to the reactor. The n-butyllithium initiator (from Lithium Corporation of America) was charged as a 2 weight percent solution in cyclohexane. The cyclohexane diluent containing the THF was preheated to about 40° C. before monomers were charged to the reactor. Monomers were styrene (from Sterling Chemical) and 1,3-butadiene (from Texas El Paso). Before charging, monomers were dried by passage over activated alumina (Kaiser A-201).

Reactants were charged to the reactor in the sequences and amounts indicated in Table 14. Lines were flushed with approximately 1.0 kg cyclohexane following each charge of monomer and with 0.5 Kg cyclohexane following each charge of initiator or additive. Polymerization was allowed to continue to completion after each monomer charge. Polymerization temperatures ranged from about 38° C. to about 110° C. and pressure ranged from about 2 psig to about 60 psig. Total monomer weight was about 90 kg.

After completion of the sequential polymerizations, Vikoflex ® 7170, (a coupling agent comprising epoxidized soybean oil, available from Viking Chemical Company) was charged to the reactor. After completion of the coupling reaction, the reaction was terminated by adding 0.1 phm carbon dioxide and 0.2 phm water. The block copolymers were stabilized by adding a mixture containing 0.25 phm Irganox ® 1076 (a hindered phenol commercially available from Ciba-Geigy) and 1.0 phm tris(nonylphenyl) phosphite (available as TNPP from GE Specialty Chemicals) to the reaction mixture. Each stabilizer was dissolved separately in cyclohexane and then the solutions were mixed together. Enough of the mixture was added to the reactor to provide 0.25 phm hindered phenol and 1 phm organic phosphite. In Runs 1 and 2 a microcrystalline wax (BE Square ® 195) was also added as an antiblocking agent.

Substantially all of the remaining diluent was removed by passing the mixture through a Luwa Filmtruder at 155° C., with a residence time of approximately 2 minutes. The resulting polymer was stranded and pelletized in a devolitilizing extruder at about 155° C. with a residence time of approximately 3-4 minutes.

TABLE 14

| Invention Runs - First Embodiment | | |
|---|---|---|
| | Run 1 | Run 2 |
| Step 1 | | |
| Cyclohexane, phm | 168.9 | 168.9 |
| Tetrahydrofuran, phm | 0.04 | 0.3 |
| n-Butyllithium initiator, phm | 0.034 | 0.033 |
| Styrene, phm | 40 | 40 |
| Cyclohexane, phm | 1.7 | 1.7 |
| Peak Polymerization Temperature, °C. | 91.6 | 94.6 |
| Peak Polymerization Pressure, psi | 38.0 | 35.8 |
| Polymerization Time, min | 4 | 3 |
| Step 2 | | |
| n-Butyllithium initiator, phm | 0.030 | 0.022 |
| Styrene, phm | 20 | 20 |
| Cyclohexane, phm | 1.7 | 1.7 |
| Peak Polymerization Temperature, °C. | 89.8 | 90.1 |
| Peak Polymerization Pressure, psi | 36.4 | 37.0 |
| Polymerization Time, min | 4 | 3 |
| Step 3 | | |
| n-Butyllithium, initiator, phm | 0.040 | 0.040 |
| Styrene, phm | 10 | 10 |
| Cyclohexane, phm | 1.7 | 1.7 |
| Peak Polymerization Temperature, °C. | 83.8 | 84.6 |
| Peak Polymerization Pressure, psi | 36.8 | 37.5 |
| Polymerization Time, min | 3 | 2 |
| Step 4 | | |
| Butadiene, phm | 15 | 15 |
| Styrene, phm | 15 | 15 |
| Cyclohexane, phm | 2.2 | 2.2 |

TABLE 14-continued

| Invention Runs - First Embodiment | | |
|---|---|---|
| | Run 1 | Run 2 |
| Peak Polymerization Temperature, °C. | 111.0 | 111.5 |
| Peak Polymerization Pressure, psi | 55.8 | 54.7 |
| Polymerization Time, min | 8 | 6 |
| Polymer Analysis (prior to coupling) (GPC area composition)[a] | | |
| Peak 1 | 139.3 | 151.0 |
| Peak 2 | 58.9 | 72.6 |
| Peak 3 | 37.0 | 44.6 |
| Step 5 (Coupling) | | |
| Vikoflex 7170, phm | 0.27 | 0.25 |
| Cyclohexane, phm | 0.6 | 0.6 |
| Temperature, °C. | 99.3 | 98.4 |
| Pressure, psi | 50 | 50.5 |
| Step 6 (Terminating) | | |
| Water, phm | 0.20 | 0.2 |
| Carbon Dioxide, phm | 0.17 | 0.17 |
| Step 7 (Stabilizing) | | |
| Stabilizer Mixture, phm | 1.25 | 1.25 |
| Antiblocking agent, phm | .18 | .18 |
| Recovered Resin | | |
| Melt Flow, g/10 min | 8.0 | 8.6 |

[a]Response of a dielectric detector in an Applied Automation process control GPC.

Injection molded test specimens of the block copolymers exhibited the properties shown in Table 15.

TABLE 15

| Physical Properties of Injection Molded Articles (First Embodiment) | | |
|---|---|---|
| Property | Invention Polymer 1 | Invention Polymer 2 |
| Melt flow, g/10 min | 8.0 | 8.6 |
| Haze, % | 0.9 | 0.9 |
| Hunter blueness, b | −2.42 | −4.28 |
| Shore D Hardness | 77 | 75 |
| Notched Izod impact, J/m | 22.4 | 24.0 |
| Tensile strength | | |
| yield, MPa | 44.7 | 42.3 |
| break, MPa | 28.0 | 28.6 |
| Elongation | | |
| yield, % | 5.42 | 5.09 |
| break, % | 89.8 | 68.3 |
| Flexural modulus, MPa | 1765 | 1724 |

Example II

This example describes four invention polymerization runs which were made to exemplify the second embodiment of the invention. Styrene (from Sterling Chemical) and 1,3-butadiene (from Texas El Paso) were dried by passage over activated alumina (Kaiser A-201), and then copolymerized and coupled in a 4-stage process using n-butyllithium initiator (from Lithium Corporation of America).

Polymerization runs were carried out under nitrogen in a stirred, jacketed, stainless steel 7.6-liter reactor employing essentially anhydrous reactants and conditions. The anhydrous mixtures were stirred continuously during the polymerization process. The cyclohexane diluent, which contained 0.04 phm tetrahydrofuran (THF) in each polymerization in this example, was preheated to about 50° C. before monomers were charged to the reactor. The n-butyllithium was charged as a 2 weight percent solution in cyclohexane. In the polymerization step in which both butadiene and styrene were charged, they were charged simultaneously as a mixture.

In the coupling step, the Vikoflex ® 7170 coupling agent used was an epoxidized vegetable oil commercially available from Viking Chemical Company. In the terminating step, carbon dioxide from a pressurized container was admitted to provide about 0.4 phm carbon dioxide to the reactor. Water was also added in an amount slightly in stoichiometric excess of the initiator to separate the lithium residues from the polymer chains.

The antioxidant mixture added in the stabilizing step contained a hindered phenol [octadecyl 3-(3′,5′-di-t-butyl-4′-hydroxyphenyl) propionate, commercially available as Irganox ® 1076 from Ciba-Geigy] and an organic phosphite (trisnonylphenyl phosphite, available as TNPP from GE Specialty Chemicals). Each stabilizer was dissolved separately in cyclohexane and mixed together. Enough of the mixture was added to the reactor to provide 0.25 phm hindered phenol and 1 phm organic phosphite. In all four runs, a microcrystalline wax (BE Square ® 195) was also added as an antiblocking agent.

After each addition of monomer, initiator or additive, the feed lines were rinsed with approximately 3–20 phm cyclohexane solvent and cleared with a nitrogen purge.

Following the stabilization step, each copolymer solution was flashed at 178°–180° C. to remove a portion of the diluent. Substantially all of the remaining diluent was removed in a vacuum oven by drying at 90° C. for one hour. The resulting polymer was chopped in a granulator into crumb and then dried for an additional hour in a vacuum oven.

In each of the four runs (3, 4, 5 and 6), 1500 g total monomers (butadiene and styrene) were used. About 76 weight percent of the total amount of cyclohexane diluent (3130 g) was charged initially. The remaining cyclohexane diluent was added during the run as a diluent or flush for the various reactants added in subsequent steps. In these four polymerizations, the weight ratio of total monomers charged was 85:15 styrene/butadiene.

The charges and the results of the runs are summarized in Table 16. Tapered butadiene/styrene blocks were formed in step 3 by charging both butadiene and styrene monomers. The charging sequence used was i, $S_1$, i, $S_2$, $B_1/S_3$, $S_4$, coupling agent. The monomer ratios corresponding to the $S_1$, $S_2$, $B_1/S_3$, $S_4$ sequence were 40, 20, 15/15, 10. Weight ratios of amounts of initiator used in the first two steps of each of the five runs was kept constant at 1:1.

The devolatilized copolymers from runs 3, 4, 5 and 6 were designated invention copolymers 3, 4, 5 and 6 had melt flows of 5.0 g/10 min, 9.4 g/10 min, 9.4 g/19 min and 7.4 g/10 min, respectively. The differences in melt flows were attributable to differences in amounts of initiator used in each of the four runs.

Injection molded test specimens of the block copolymers exhibited the properties shown in Table 18 after Example III.

TABLE 16

| Invention Runs - Second Embodiment | | | | |
|---|---|---|---|---|
| | Run 3 | Run 4 | Run 5 | Run 6 |
| Step 1 | | | | |
| Cyclohexane, phm | 157 | 157 | 157 | 157 |
| Tetrahydrofuran, phm | 0.04 | 0.30 | 0.50 | 1.0 |
| n-Butyllithium initiator, phm | 0.03 | 0.03 | 0.03 | 0.03 |
| Cyclohexane, phm | 4.6 | 4.6 | 4.6 | 4.6 |

TABLE 16-continued

| Invention Runs - Second Embodiment | | | | |
|---|---|---|---|---|
| | Run 3 | Run 4 | Run 5 | Run 6 |
| Styrene, phm | 40 | 40 | 40 | 40 |
| Cyclohexane, phm | 4.6 | 4.6 | 4.6 | 4.6 |
| Peak Polymerization Temperature, °C. | 80.5 | 89.4 | 92.1 | 83.6 |
| Peak Polymerization Pressure, psi | 22 | 29 | 35 | 28 |
| Polymerization Time, min | 12 | 12 | 12 | 12 |
| Step 2 | | | | |
| n-Butyllithium initiator, phm | 0.06 | 0.055 | 0.05 | 0.04 |
| Cyclohexane, phm | 4.6 | 4.6 | 4.6 | 4.6 |
| Styrene, phm | 20 | 20 | 20 | 20 |
| Cyclohexane, phm | 4.6 | 4.6 | 4.6 | 4.6 |
| Peak Polymerization Temperature, °C. | 81.3 | 84.8 | 88.3 | 86.7 |
| Peak Polymerization Pressure, psi | 30 | 34 | 28 | 37 |
| Polymerization Time, min | 11 | 11 | 11 | 11 |
| Step 3 | | | | |
| Styrene, phm | 15 | 15 | 15 | 15 |
| Butadiene, phm | 15 | 15 | 15 | 15 |
| Cyclohexane, phm | 4.6 | 4.6 | 4.6 | 4.6 |
| Peak Polymerization Temperature, °C. | 107.2 | 109.9 | 115.4 | 114.5 |
| Peak Polymerization Pressure, psi | 64 | 41 | 47 | 62 |
| Polymerization Time, min | 18 | 16 | 16 | 16 |
| Step 4 | | | | |
| Styrene, phm | 10 | 10 | 10 | 10 |
| Cyclohexane, phm | 4.6 | 4.6 | 4.6 | 4.6 |
| Peak Polymerization Temperature, °C. | 87.9 | 89.8 | 93.3 | 93.3 |
| Peak Polymerization Pressure, psi | 68 | 68 | 37 | 71 |
| Polymerization Time, min | 12 | 12 | 12 | 12 |
| Step 5 (Coupling) | | | | |
| Vikoflex ® 7170, phm | 0.24 | 0.22 | 0.20 | 0.18 |
| Cyclohexane, phm | 4.6 | 4.6 | 4.6 | 4.6 |
| Temperature, °C. | 90 | 92 | 86 | 95 |
| Pressure, psi | 87 | 96 | 63 | 97 |
| Step 6 (Terminating) | | | | |
| Water, phm | 0.2 | 0.2 | 0.2 | 0.2 |
| Carbon Dioxide, phm | 0.4 | 0.4 | 0.4 | 0.4 |
| Temperature, °C. | 98 | 100 | 107 | 121 |
| Pressure, psi | 82 | 57 | 70 | 86 |
| Step 7 (Stabilizing) | | | | |
| Stabilizer Mixture, phm | 1.25 | 1.25 | 1.25 | 1.25 |
| Antiblocking agent, phm | 0.3 | 0.3 | 0.3 | 0.3 |
| Recovered Resin | | | | |
| Melt Flow, g/10 min | 5.0 | 9.4 | 9.4 | 7.4 |

Example III

Two more polymerization runs (7 and 8) were carried out according to the second embodiment of the invention to demonstrate the use of larger volumes of monomers. The procedure of Example I was followed with the exception that the sequence of charges shown in Table 17 was used. Again, the weight ratio of styrene to butadiene charged was 85 to 15. Samples were made with i, $S_1$, i, $S_2$, $B_1/S_3$, $S_4$ addition sequence followed by coupling; monomer ratios of 35, 20, 15/15, 15 were used.

In this example, 0.032 phm (run 7) initiator and 0.031 phm initiator (run 8) was charged in the first steps of the two runs. The amount of initiator charged in the second step was 0.075 phm (run 7) and 0.064 phm (run 8) for a range of ratios of amount of initiator in first step to amount in second step of 1:2.3 (run 7) to 1:2.1 (run 8).

Copolymers from runs 7 and 8, were devolatilized to form invention copolymers 7 and 8, which had melt flows of 8.1 g/10 min and 8.2 g/10 min, respectively. Injection molded test specimens of invention copolymers 7 and 8 exhibited the properties shown in Table 18.

TABLE 17

| Invention Runs - Second Embodiment | | |
|---|---|---|
| Components[a] | Run 7 | Run 8 |
| Step 1 | | |
| Cyclohexane, phm | 168.9 | 168.9 |
| Tetrahydrofuran | 0.04 | 0.3 |
| n-Butyllithium initiator, phm | 0.032 | 0.031 |
| Styrene, phm | 35 | 35 |
| Polymerization Time, min | 4 | 2 |
| Peak Polymerization Temperature, °C. | 84.9 | 89.6 |
| Peak Polymerization Pressure, psi | 35.1 | 36.4 |
| Step 2 | | |
| n-Butyllithium initiator, phm | 0.075 | 0.064 |
| Styrene, phm | 20 | 20 |
| Polymerization Time, min | 3 | 3 |
| Peak Polymerization Temperature, °C. | 86.8 | 86.7 |
| Step 3 | | |
| Butadiene, phm | 15 | 15 |
| Styrene, phm | 15 | 15 |
| Polymerization Time, min | 8 | 6 |
| Peak Polymerization Temperature, °C. | 105.2 | 107.8 |
| Step 4 | | |
| Styrene, phm | 15 | 15 |
| Polymerization Time, min | 3 | 3 |
| Peak Polymerization Temperature, °C. | 88.0 | 88.9 |
| Step 5 (Coupling) | | |
| Vikoflex 7170, phm | 0.28 | 0.25 |
| Temperature, °C. | 77.4 | 74.5 |
| Step 6 (Terminating) | | |
| Water, phm | 0.2 | 0.2 |
| Carbon Dioxide, phm | 0.17 | 0.17 |
| Step 7 (Stabilizing) | | |
| Stabilizer Mixture, phm | 1.25 | 1.25 |
| BE Square wax | 0.18 | 0.18 |
| Recovered Resin | | |
| Melt Flow, g/10 min | 8.1 | 8.2 |

[a]After each addition of monomer, initiator or additive, the feed lines were rinsed with approximately 5-20 phm cyclohexane diluent and cleared with nitrogen.

TABLE 18

Physical Properties of Injection Molded Articles Made from Invention Polymers
(Second Embodiment)

| Property | Invention Polymer 3 | Invention Polymer 4 | Invention Polymer 5 | Invention Polymer 6 | Invention Polymer 7 | Invention Polymer 8 |
|---|---|---|---|---|---|---|
| Melt flow, g/10 min | 5.0 | 9.4 | 9.4 | 7.4 | 8.1 | 8.2 |
| Haze, % | 1.0 | 0.7 | 1.1 | 1.4 | 1.0 | 0.9 |
| Hunter blueness, b | −1.6 | −3.1 | −2.3 | −2.1 | −1.45 | −1.63 |
| Shore D Hardness | 77 | 77 | 76 | 75 | 78 | 78 |
| Notched Izod impact, J/m | 20.3 | 21.9 | 21.9 | 21.9 | 24.6 | 23.0 |
| Tensile strength | | | | | | |
| yield, MPa | 43.4 | 39.1 | 38.5 | 33.5 | 39.0 | 37.5 |
| break, MPa | 30.3 | 24.1 | 24.9 | 22.9 | 26.4 | 25.9 |
| Elongation | | | | | | |
| yield, % | 5.95 | 6.21 | 5.73 | 5.47 | 4.8 | 5.01 |
| break, % | 163 | 116 | 96 | 116 | 76.5 | 98.7 |
| Flexural modulus, MPa | 1565 | 1393 | 1407 | 1241 | 1662 | 1565 |

Example IV

A polymerization was made to demonstrate the third embodiment of the invention. This run (9) was carried out according to the procedure of Example I with the exception that the sequences and amounts of charges shown in Table 19 were used. The weight ratio of styrene to butadiene charged was 85 to 15.

The coupled devolatilized copolymers from run 9 contained no tapered blocks, contained a single internal butadiene block (disregarding any coupling moiety) and had terminal styrene blocks on each of the extending arms of each of the coupled polymeric species.

A copolymer from run 9 was devolatilized to form invention copolymer 9 which had a melt flow of 10.2 g/10 min.

TABLE 19

| Invention Runs - Third Embodiment | |
|---|---|
| | Run 9 |
| Step 1 | |
| Cyclohexane, phm | 168.9 |
| Tetrahydrofuran, phm | 0.04 |
| n-Butyllithium initiator, phm | 0.032 |
| Styrene, phm | 40 |
| Cyclohexane, phm | 1.7 |
| Peak Polymerization Temperature, °C. | 90.0 |
| Peak Polymerization Pressure, psi | 36.7 |
| Polymerization Time, min | 5 |
| Step 2 | |
| n-Butyllithium initiator, phm | 0.034 |
| Styrene, phm | 20 |
| Cyclohexane, phm | 1.7 |
| Peak Polymerization Temperature, °C. | 87.7 |
| Peak Polymerization Pressure, psi | 34.4 |
| Polymerization Time, min | 4 |
| Step 3 | |
| n-Butyllithium initiator, phm | 0.100 |
| Styrene, phm | 10 |
| Cyclohexane, phm | 1.7 |
| Peak Polymerization Temperature, °C. | 85.1 |
| Peak Polymerization Pressure, psi | 36.7 |
| Polymerization Time, min | 3 |
| Step 4 | |
| Styrene, phm | 15 |
| Cyclohexane, phm | 1.1 |
| Peak Polymerization Temperature, °C. | 87.8 |
| Peak Polymerization Pressure, psi | 40.0 |
| Polymerization time, min | 3 |
| Step 5 | |
| Butadiene, phm | 0.5 |

TABLE 19-continued

Invention Runs - Third Embodiment

| | Run 9 |
|---|---|
| Cyclohexane, phm | 1.1 |
| Peak Polymerization Temperature, °C. | 105.2 |
| Peak Polymerization Pressure, psi | 51.4 |
| Polymerization Time, min | 5 |
| Polymer Analysis (prior to coupling) (GPC area composition)[a] | |
| Peak 1 | 123.6 |
| Peak 2 | 43.4 |
| Peak 3 | 22.9 |
| Step 6 (Coupling) | |
| Vikoflex 7170, phm | 0.43 |
| Cyclohexane, phm | 0.6 |
| Temperature, °C. | 97.2 |
| Pressure, psi | 49.6 |
| Step 7 (Terminating) | |
| Water, phm | 0.2 |
| Carbon Dioxide, phm | 0.17 |
| Temperature, °C. | — |
| Pressure, psi | — |
| Step 8 (Stabilizing) | |
| Stabilizer Mixture, phm | 1.25 |
| Antiblocking agent, phm | 0.18 |
| Recovered Resin | |
| Melt Flow, g/10 min | 10.2 |

[a]Response of a dielectric detector in an Applied Automation process control GPC.

Injection molded test specimens of the polymodal block copolymer of run 9 were made and found to exhibit the properties shown in Table 20.

TABLE 20

Physical Properties of Injection Molded Articles (Third Embodiment)

| Property | Invention Polymer 9 |
|---|---|
| Melt flow, g/10 min | 10.2 |
| Haze, % | 0.7 |
| Hunter blueness, b | −1.75 |
| Shore D Hardness | 77 |
| Notched Izod impact, J/m | 24.0 |
| Tensile strength | |
| yield, MPa | 47.9 |
| break, MPa | 48.3 |
| Elongation | |
| yield, % | 5.33 |
| break, % | 5.63 |
| Flexural modulus, MPa | 1972 |

Example V

A polymerization run was made for the purpose of demonstrating the fourth embodiment of this invention. The method of Example I was used, with the exception that the sequence and amounts of charges shown in Table 21 were used.

The polymodal block copolymer of run 10 (designated invention copolymer 10) had two sequentially internal tapered blocks and terminal styrene blocks on each of the coupled polymeric species. The block copolymer had a styrene to butadiene ratio of 88 to 12 and a melt flow of 20.0 g/10 min.

Injection molded test specimens of invention copolymer 10 exhibited the properties shown in Table 22.

TABLE 21

Invention Run - Fourth Embodiment

| | Run 10 |
|---|---|
| Step 1 | |
| Cyclohexene, phm | 168.9 |
| Tetrahydrofuran, phm | 0.04 |
| n-Butyllithium initiator, phm | 0.022 |
| Styrene, phm | 40 |
| Cyclobexane, phm | 1.7 |
| Peak Polymerization Temperature, °C. | 84.0 |
| Peak Polymerization Pressure, psi | 34.6 |
| Polymerization Time, min | 5 |
| Step 2 | |
| n-Butyllithium initiator, phm | 0.020 |
| Styrene, phm | 20 |
| Cyclohexane, phm | 1.7 |
| Peak Polymerization Temperature, °C. | 86.5 |
| Peak Polymerization Pressure, psi | 83.9 |
| Polymerization Time, min | 3 |
| Step 3 | |
| n-Butyllithium initiator, phm | 0.100 |
| Styrene, phm | 16 |
| Cyclohexane, phm | 1.7 |
| Peak Polymerization Temperature, °C. | 87.2 |
| Peak Polymerization Pressure, psi | 37.1 |
| Polymerization Time, min | 3 |
| Step 4 | |
| Butadiene, phm | 5 |
| Styrene, phm | 5 |
| Cyclohexane, phm | 2.2 |
| Peak Polymerization Temperature, °C. | 81.2 |
| Peak Polymerization Pressure, psi | 38.1 |
| Polymerization Time, min | 9 |
| Step 5 | |
| Butadiene, phm | 7 |
| Styrene, phm | 7 |
| Cyclohexane, phm | 2.2 |
| Peak Polymerization Temperature, °C. | 87.3 |
| Peak Polymerization Pressure, psi | 43.8 |
| Polymerization Time, min | 7 |
| Polymer Analysis (prior to coupling) (GPC area composition)[a] | |
| Peak 1 | 187.3 |
| Peak 2 | 36.1 |
| Step 6 (Coupling) | |
| Vikoflex 7170, phm | 0.41 |
| Cyclohexane, phm | 0.6 |
| Temperature, °C. | 74.5 |
| Pressure, psi | 41.7 |
| Step 7 (Terminating) | |
| Water, phm | 0.2 |
| Carbon Dioxide, phm | 0.17 |
| Temperature, °C. | — |
| Pressure, psi | — |
| Step 8 (Stabilizing) | |
| Stabilizer Mixture, phm | 1.25 |
| Antiblocking agent, phm | 0.18 |
| Recovered Resin | |
| Melt Flow, g/10 min | 20.0 |

[a]Response of a dielectric detector in an Applied Automation process control GPC.

TABLE 22

Physical Properties of Injection Molded Articles
(Fourth Embodiment)

| Property | Invention Polymer 10 |
|---|---|
| Melt flow, g/10 min | 20.0 |
| Haze, % | 0.8 |
| Hunter blueness, b | −1.7 |
| Shore D Hardness | 80 |
| Notched Izod impact, J/m | 20.8 |
| Tensile strength | |
| yield, MPa | 50.4 |
| break, MPa | 31.5 |
| Elongation | |
| yield, % | 6.37 |
| break, % | 15.71 |
| Flexural modulus, MPa | 1800 |

Example VI

Three more polymers were prepared to use in blends for comparison with the invention polymers. Polymerization runs 11, 12 and 13 were carried out according to the method of Example II, except that the weight ratio of styrene to butadiene charged was 75 to 25 and samples were made with i, $S_1$, i, $S_2$, $B_1/S_3$ addition sequence followed by coupling; monomer ratios of 40, 10, 25/25 were used. The charges and results of the runs are shown in Table 23.

In each of the three runs of this example, 0.03 phm initiator was charged in the first step. The amount of initiator charged in the second step was varied from 0.08 phm (run 11) to 0.095 phm (run 13) for a range of ratios of amount of initiator in first step to amount in second step from 1:2.7 (run 11) to 1:3.2 (run 13).

Copolymers from runs 11, 12 and 13 were devolatilized to form comparative copolymers 11, 12 and 13, which had melt flows of 5.0 g/10 min, 5.4 g/10 min, and 7.1 g/10 min, respectively.

TABLE 23

| Components[a] | Comparative Runs | | |
|---|---|---|---|
| | Run 11 | Run 12 | Run 13 |
| Step 1 | | | |
| Cyclohexane, phm | 145 | 145 | 145 |
| Tetrahydrofuran | 0.04 | 0.04 | 0.04 |
| n-Butyllithium initiator, phm | 0.03 | 0.03 | 0.03 |
| Styrene, phm | 40 | 40 | 40 |
| Polymerization Time, min | 12 | 12 | 12 |
| Peak Polymerization Temperature, °C. | 77 | 79 | 76 |
| Step 2 | | | |
| n-Butyllithium initiator, phm | 0.08 | 0.085 | 0.095 |
| Styrene, phm | 10 | 10 | 10 |
| Polymerization Time, min | 12 | 12 | 12 |
| Peak Polymerization Temperature, °C. | 64 | 71 | 65 |
| Step 3 | | | |
| Butadiene, phm | 25 | 25 | 25 |
| Styrene, phm | 25 | 25 | 25 |
| Polymerization Time, min | 16 | 16 | 16 |
| Peak Polymerization Temperature, °C. | 117 | 121 | 111 |
| Step 4 (Coupling) | | | |
| Vikoflex 7170, phm | 0.4 | 0.4 | 0.4 |
| Time, min | 16 | 16 | 16 |
| Temperature, °C. | 88 | 87 | 89 |
| Step 5 (Terminating) | | | |
| Water, phm | 0.2 | 0.2 | 0.2 |
| Carbon Dioxide, phm | 0.4 | 0.4 | 0.4 |
| Time, min | 25 | 25 | 25 |
| Temperature, °C. | 82 | 82 | 84 |
| Step 6 (Stabilizing) | | | |
| Stabilizer Mixture, phm | 1.25 | 1.25 | 1.25 |
| BE Square wax | 0.15 | 0.15 | 0.15 |
| Time, min | 5 | 5 | 5 |
| Recovered Resin | | | |
| Melt Flow, g/10 min | 5.0 | 5.4 | 7.1 |
| Mw/Mn, thousands | 181/114 | 177/111 | 138/93 |
| Heterogeneity Index | 1.6 | 1.6 | 1.69 |

[a]After each addition of monomer, initiator or additive, the feed lines were rinsed with approximately 5–20 phm cyclohexane diluent and cleared with nitrogen.

Example VII

Two more comparative polymers (14 and 15) were used for making comparisons of physical properties of blends of the comparative polymers with polystyrene to physical properties of the invention copolymers.

Comparative polymer 14 was a resinous styrene-butadiene copolymer with a melt flow of 8.4 g/10 min. Polymer 14 was polymodal from multiple initiator and monomer charges (S, i, i, S, B, i, S, B) and coupled with an epoxidized vegetable oil coupling agent. Polymer 14 contained nominally 75 wt % styrene and 25 wt % butadiene with no styrene/butadiene tapered blocks. Comparative polymer 14 is similar to the third embodiment of the invention with the exceptions that comparative polymer 14 had a charge of butadiene in place of the third charge of initiator and monovinylarene monomer in the third embodiment and the third embodiment can have a proportionately higher monovinylarene content relative to conjugated diene content than comparative polymer 14 had. Polymer 14 formed 50:50 by weight blends with polystyrene that had high blueness and modest physical properties.

Comparative polymer 15 was a styrene-butadiene copolymer with no tapered block segments. Polymer 15 contained nominally 75 wt % styrene and 25 wt % butadiene and had a melt flow of 8.8 g/10 min. It had a polymodal molecular weight from multiple initiator and monomer charges (S, i, i, S, B) and was coupled with an epoxidized vegetable oil coupling agent. Comparative polymer 15 was similar to the third embodiment with the exceptions that: the third embodiment was made with two additional charges next preceding the conjugated diene charge, i.e., a charge of monovinylarene monomer and initiator followed by a charge of monovinylarene monomer; and, the third embodiment can contain a proportionately much larger monovinylarene content than that of comparative polymer 15. Polymer 15 formed 50:50 blends by weight with polystyrene that had low blueness and modest impact properties.

Example VIII

A series of blends of the comparison polymers from Examples VI and VII was prepared with Novacor ® 555 general purpose polystyrene to demonstrate the properties of blends of the comparative copolymers containing total amounts of styrene similar to the total amounts of monovinylarene content in the invention copolymers of Examples I–V.

The blends were 50:50 or 60:40 styrene:butadiene by weight as indicated in the table and were prepared by solution blending in cyclohexane in a reactor at 100° C. with stirring for one hour. Each solution was flashed to remove the solvent and the polymer was dried, chopped in a granulator, and dried again. The dry polymer was processed on a roll mill and chopped again before injection molding on an Arburg model 90 injection molder with zones 1, 2, 3, and nozzle at 210° C., 210° C., 220° C., and 210° C., respectively, to make specimens to test for properties.

For convenient reference, blends are designated with the corresponding polymer numbers. For example, a blend prepared from comparative polymer 11 and polystyrene is comparative blend 11.

The results of tests of articles made from the comparative blends are shown in Table 24. Test specimens made from the blends of comparative polymers 11–15 exhibit significantly higher haze and blueness and significantly lower notched izod impact strengths than those of the inventive polymers. Thus the inventive polymers are superior to the blends in these areas for most applications. Also, the inventive polymers from embodiments 1 and 2 exhibit significantly higher tensile elongation at break than do the blend polymers, indicating greater ductility. Generally, the other properties of the blends and inventive polymers are similar.

TABLE 24

Physical Properties of Test Specimens Made from Blends of Comparison Polymers with Polystyrene

| Property | Comparative Blend 11 | Comparative Blend 12 | Comparative Blend 13 | Comparative Blend 14 | Comparative Blend 15 |
|---|---|---|---|---|---|
| Blend ratio, S-B:PS[a] | 50:50 | 50:50 | 50:50 | 50:50 | 50:50 |
| Blend melt flow, g/10 min | 30.2 | 10.7 | 12.8 | 16.8 | 17.5 |
| Haze, % | 8.1 | 3.4 | 4.2 | 4.3 | 2.7 |
| Hunter blueness, b | −16.2 | −16.9 | −17.1 | −20.3 | −16.8 |
| Shore D Hardness | 77 | 77 | 77 | 77 | 79 |
| Notched Izod impact, J/m | 14.6 | 17.1 | 12.3 | 12.4 | 13.9 |
| Vicat, ° | 82.9 | 92.1 | 92.0 | 85.3 | 89.3 |
| Tensile strength | | | | | |
| yield, MPa | 40.2 | 44.5 | 42.5 | 37.8 | 42.6 |
| break, MPa | 27.5 | 33.7 | 21.4 | 28.0 | 33.4 |
| Elongation | | | | | |
| yield, % | 5.3 | 6.2 | 6.2 | 4.8 | 4.8 |
| break, % | 18.2 | 14.7 | 13.7 | 32.0 | 15.77 |
| Flexural modulus, MPa | 1836 | 2091 | 2016 | 1979 | 2124 |

S-B:PS = Styrene-butadiene copolymer:polystyrene

Example IX

To provide comparison polymers having more than one tapered block, three more polymerization runs (16, 17 and 18) were carried out according to the procedures described in Example II, with the exception that the sequences and amounts of charges were as shown in Table 25. Tapered butadiene/styrene blocks were formed in the third and fourth steps by charging a mixture of butadiene and styrene monomers. The monomer addition sequence was i, $S_1$, i, $S_2$, $B_1/S_3$, $B_2/S_4$ followed by coupling; the monomer weight ratios were 40, 10, 12.5/12.5, 12.5/12.5, respectively. The polymers were 75 percent styrene and 25 percent butadiene.

In each of the three runs of this example the weight ratio of amount of initiator in the first step to the amount in the second step was kept constant at 1:1 with the absolute amount varied from 0.06 phm (run 16) to 0.055 phm (run 18).

The copolymers produced in the three runs were designated comparative copolymers 16, 17, and 18, and had melt flows of 14.3, 6.40 and 10.8 respectively. It is believed that lower melt flows are attributable to lower amounts of initiator. The polymerizations of invention runs 16, 17 and 18 are shown in Table 25.

TABLE 25

| Components[a] | Comparative Runs | | |
|---|---|---|---|
| | Run 16 | Run 17 | Run 18 |
| Step 1 | | | |
| Cyclohexane, phm | 145 | 145 | 145 |
| Tetrahydrofuran, phm | 0.04 | 0.04 | 0.04 |
| n-Butyllithium initiator, phm | 0.06 | 0.05 | 0.055 |
| Styrene, phm | 40 | 40 | 40 |
| Polymerization Time, min | 12 | 12 | 12 |
| Peak Polymerization Temperature, °C. | 85 | 82 | 84 |
| Step 2 | | | |
| n-Butyllithium initiator, phm | 0.06 | 0.05 | 0.055 |
| Styrene, phm | 10 | 10 | 10 |
| Polymerization Time, min | 12 | 12 | 12 |
| Peak Polymerization Temperature, °C. | 69 | 69 | 70 |
| Step 3 | | | |
| Butadiene, phm | 12.5 | 12.5 | 12.5 |
| Styrene, phm | 12.5 | 12.5 | 12.5 |
| Polymerization Time, min | 16 | 16 | 16 |
| Peak Polymerization Temperature, °C. | 84 | 83 | 84 |
| Step 4 | | | |
| Butadiene, phm | 12.5 | 12.5 | 12.5 |
| Styrene, phm | 12.5 | 12.5 | 12.5 |
| Polymerization Time, min | 16 | 16 | 16 |
| Peak Polymerization Temperature, °C. | 96 | 102 | 102 |
| Step 5 (Coupling) | | | |
| Vikoflex 7170, phm | 0.4 | 0.4 | 0.4 |
| Time, min | 16 | 16 | 16 |
| Temperature, °C. | 82 | 89 | 89 |
| Step 6 (Terminating) | | | |
| Water, phm | 0.2 | 0.2 | 0.2 |
| Carbon Dioxide, phm | 0.4 | 0.4 | 0.4 |
| Time, min | 25 | 25 | 25 |
| Temperature, °C. | 80 | 82 | 82 |
| Step 7 (Stabilizing) | | | |
| Stabilizer Mixture, phm | 1.25 | 1.25 | 1.25 |
| Antiblocking agent, phm | 0.15 | 0.15 | 0.15 |
| Time, min | 5 | 5 | 5 |
| Temperature, °C. | 80 | n.a. | 81 |
| Recovered Resin | | | |
| Melt Flow, g/10 min | 14.3 | 6.4 | 10.8 |
| Mw/Mn, thousands | 154/104 | 173/115 | 147/91 |

TABLE 25-continued

| Components[a] | Comparative Runs | | |
|---|---|---|---|
| | Run 16 | Run 17 | Run 18 |
| Heterogeneity Index | 1.48 | 1.50 | 1.62 |

[a]After each addition of monomer, initiator or additive, the feed lines were rinsed with approximately 5-20 phm cyclohexane diluent and cleared with nitrogen.

Example X

A series of blends of double tapered block comparative polymers with polystyrene was prepared for comparison of the properties of articles made from the blends to properties of invention polymers having two tapered blocks and similar total styrene content. Copolymers 16, 17, and 18 from Example IX were blended as described in Example VIII in 50:50 by weight mixtures with general purpose polystyrene to form comparative blends 16, 17, and 18. Test specimens were injection molded from the blends as described in Example VIII.

The results (Table 26) show that articles made from blends of comparative polymers 16, 17, and 18 had more modest Izod impact values than those made from invention polymer 10 which also had two tapered blocks (shown in Table 22). Articles made from blends of the invention polymers also have less blueness than those made from comparative blends 16, 17 and 18.

TABLE 26

| Physical Properties of Comparative Polymer Blends with Polystyrene[a] | | | | |
|---|---|---|---|---|
| Property | Comparative Blend 16 | Comparative Blend 17 | Comparative Blend 18 | Comparative Blend 14 |
| Blend melt flow, g/10 min | 14.8 | 12.0 | 14.8 | 16.8 |
| Haze, % | 4.1 | 4.0 | 5.1 | 4.3 |
| Hunter blueness, b | −17.9 | −18.5 | −17.9 | −20.3 |
| Shore D hardness | 76 | 77 | 76 | 77 |
| Notched Izod impact, J/m | 14.9 | 17.1 | 19.2 | 12.3 |
| Vicat softening, °C. | 89.3 | 90.9 | 90.5 | 85.3 |
| Tensile Strength | | | | |
| yield MPa | 43.2 | 43.9 | 42.5 | 37.8 |
| break MPa | 29.6 | 28.7 | 28.7 | 28.0 |
| Elongation | | | | |
| yield, % | 6.4 | 6.5 | 6.5 | 4.8 |
| break, % | 17.9 | 16.7 | 13.6 | 32.0 |
| Flexural modulus, MPa | 1988 | 1949 | 1986 | 1979 |

[a]50:50 Styrene-butadiene copolymer:polystyrene

Example XI

Polymerization runs were carried out in a stirred, 100 gallon carbon steel reactor with internal cooling coils employing essentially anhydrous reactants and conditions.

Sequential polymerizations were conducted under nitrogen. Approximately 158 kg cyclohexane solvent (175 phm) were charged to the reactor. Reactants were charged to the reactor in the sequence and amount indicated in Table 27. Lines were flushed with 0.5 kg cyclohexane following each charge. Polymerization was allowed to continue to completion after each monomer or monomer mixture charge. Polymerization temperatures ranged from about 38° C. to about 110° C. and pressure ranged from about 2 psig to about 60 psig. Total monomer weight was about 90 kg.

After completion of sequential polymerizations, Vikoflex 7170, (a coupling agent comprising epoxidized soybean oil sold by Viking Chemical Co.) was charged to the reactor. After completion of the coupling reaction, the reaction was terminated by adding $CO_2$ and 0.2 phm water. The block copolymers were stabilized by adding 0.25 phm Irganox 1076 and 1.0 phm tris(nonylphenyl) phosphite to the reaction mixture.

The block copolymers and blends exhibited melt flows in the range of from 5 g/10 min. to 15 g/10 min. measured according to ASTM D-1238, condition G. The block copolymers and blends exhibited an Izod impact strength greater than 0.3 ft #/in. measured according to ASTM D-256. Blueness, tristumulus value "b", a measure of blue and yellow tint, was measured with a Hunter Lab Color Difference Meter 25 DM using three injection molded (350° F./30 tons/2 minutes) resin disks of 0.15 inch thickness and 2.5 inch diameter. Measurements were against a black background. A positive number represents yellow and a negative number represents blue.

Terms used in Table 27 are defined as follows:
S is styrene monomer in phm
i is n-butyllithium initiator in phm
B is 1,3-butadiene in phm
CA is epoxidized soybean oil coupling agent in phm
T is tetrahydrofuran in phm
Blend is 60 weight percent block copolymer (75S/25B) and 40 weight percent polystyrene

TABLE 27

| Run | | Blueness |
|---|---|---|
| Block Copolymer containing 88 weight % S | | |
| 101 | 0.04T, 40S, 0.03i, 0.02i, 20S, 5B/5S, 0.10i, 16S, 7B/7S, 0.41CA | −1.7 |
| Block Copolymer containing 85 weight % S | | |
| 102 | 0.04T, 40S, 0.03i, 0.03i, 20S, 0.10i, 10S, 15S, 15B, 0.43CA | −1.8 |
| 103 | 0.04T, 40S, 0.03i, 0.03i, 20S, 0.10i, 10S, 15B/15S, 0.43CA | −2.4 |
| 104 | 0.3T, 40S, 0.03i, 0.02i, 20S, 0.04i, 10S, 15B/15S, 0.43CA | −4.3 |
| Block Copolymer containing 70 weight % S | | |
| 105 | 0.04T, 37S, i, i, 19S, 9B, i, 14S, 21B, 0.41CA | −13.3 |
| Blend containing 85 weight % S | | |
| 106 | Block Copolymer/Polystyrene Blend | −11.7 |
| 107 | Block Copolymer/Polystyrene Blend | −10.5 |
| 108 | Block Copolymer/Polystyrene Blend | −15.6 |

The results in Table 27 indicate lower blueness values for inventive polymers in Runs 101-104. compared to similar block copolymers containing 70 weight % styrene or block copolymer/polystyrene blends containing 85 weight % styrene. The odor of styrene monomer was observed in the copolymer/polystyrene blends, Runs 106–108. The odor was not observed in Runs 101–105.

Example XII

Conjugated diene/monovinylarene Block Copolymers 1 and 2 were prepared by sequential solution polymerizations employing three initiator charges, three styrene charges, and at least one butadiene charge, where at least two styrene charges precede the butadiene charge. The temperature peaked at about 110° C. after each monomer charge and polymerization was allowed to continue to substantial completion. Following completion of the sequential polymerizations, Vikoflex 7170, (a coupling agent comprising epoxidized soybean oil solid by Viking Chemical Co.) was charged to the reactor. The sequence of addition and relative amount of each charge is outlined below. S is styrene, B is butadiene, i is n-butyllithium initiator, and CA is coupling agent.

Block Copolymer 2 and Polystyrene 555, available from Novacor Plastics Division, were blended to form Polymer Blend 3.

1. Block Copolymer containing 85 weight % S 40S, i, i, 15S, 5B/5S, i, 10S, 10B/15S, CA
2. Block Copolymer containing 75 weight % S 40S, i, i, 20S, 7.5B, i, 15S, 17.5B, CA
3. Polymer Blend Containing 85 weight % S in the final Blend 60 weight % Block Copolymer 2 40 weight % Polystyrene Block Copolymer 1 and Polymer Blend 3, each containing 85 weight % styrene in the final composition, were tested for free styrene monomer and other residual organic compounds using gas chromatography. The results are tabulated in the table below. In Table 28, ppm is parts per million.

TABLE 28

| | Block Copolymer 1 | Polymer Blend 3 |
|---|---|---|
| Toluene | 1 ppm | 2 ppm |
| Vinylcyclohexene | 3 ppm | 1 ppm |
| Ethylbenzene | 0 ppm | 1 ppm |
| Isopropylbenzene | 0 ppm | 1 ppm |
| n-Propylbenzene | 0 ppm | 0 ppm |
| Styrene Monomer | 0 ppm | 128 ppm |

The data in Table 28, clearly indicate no free styrene monomer detected in Block Copolymer 1 containing 85 % styrene compared to 128 ppm free styrene monomer in Polymer Blend 3 also containing 85 % styrene. The results are consistent with the observations noted in Example XI.

While the polymers and methods of this invention have been described in detail for the purpose of illustration, the inventive polymers and methods are not to be construed as limited thereby. This patent is intended to cover all changes and modifications within the spirit and scope thereof.

That which is claimed is:

1. A method for preparing a block copolymer comprising:
   sequentially contacting under polymerization conditions at least one monovinylarene monomer, an organomonoalkali metal initiator, at least one conjugated diene monomer; and
   thereafter coupling with a polyfunctional coupling agent to form said block copolymer;
   wherein said initiator is provided in at least three initiator charges;
   wherein said at least one monovinylarene monomer contains from 8 to 18 carbon atoms and is provided in at least three monovinylarene monomer charges;
   wherein said at least one conjugated diene monomer contains from 4 to 12 carbon atoms and is provided in at least one conjugated diene monomer charge;
   wherein at least three monovinylarene monomer charges precede the first charge containing said at least one conjugated diene monomer.

2. A method as recited in claim 1 having a charge sequence as follows;
   (a) initiator and monovinylarene monomer,
   (b) initiator and monovinylarene monomer,
   (c) initiator and monovinylarene monomer,
   (d) conjugated diene monomer, and
   (e) coupling agent.

3. A method as recited in claim 1 having a charge sequence as follows;
   (a) initiator and monovinylarene monomer,
   (b) initiator and monovinylarene monomer,
   (c) initiator and monovinylarene monomer,
   (d) conjugated diene monomer/monovinylarene monomer mixture, and
   (e) coupling agent.

4. A method as recited in claim 1 having a charge sequence as follows:
   (a) initiator and monovinylarene monomer,
   (b) initiator and monovinylarene monomer,
   (c) initiator and monovinylarene monomer,
   (d) conjugated diene monomer/monovinylarene monomer mixture,
   (e) conjugated diene monomer/monovinylarene monomer mixture, and
   (f) coupling agent.

5. A method according to claim 1 wherein at least four monovinylarene monomer charges precede the first charge containing conjugated diene monomer.

6. A method as recited in claim 5 having a charge sequence as follows;
   (a) initiator and monovinylarene monomer,
   (b) initiator and monovinylarene monomer,
   (c) initiator and monovinylarene monomer,
   (d) monovinylarene monomer,
   (e) conjugated diene monomer, and
   (f) coupling agent.

7. A method according to claim 1 wherein said monomers are added in an amount in the range of about 55 to about 95 weight percent monovinylarene monomer and about 5 to about 45 weight percent conjugated diene monomer.

8. A method according to claim 7 wherein said monomers are added in an amount in the range of about 60 to about 95 weight percent monovinylarene monomer and about 5 to about 40 weight percent conjugated diene monomer.

9. A method according to claim 8 wherein said monomers are added in an amount in the range of about 80 to about 95 weight percent monovinylarene monomer and about 5 to about 20 weight percent conjugated diene monomer.

10. A process according to claim 1 wherein the first monovinylarene monomer charge contains monovinylarene monomer in an amount in the range of from about 30 weight percent to about 50 weight percent based on the total weight of the final block copolymer.

11. A process according to claim 1 wherein the second monovinylarene monomer charge contains monovinylarene monomer in an amount in the range of from about 15 weight percent to about 30 weight percent based on the total weight of the final block copolymer.

12. A process according to claim 1 wherein the third monovinylarene monomer charge contains monovinylarene monomer in the range of from about 5 weight percent to about 30 weight percent based on the total weight of the final block copolymer.

13. A process according to claim 5 wherein the third and fourth monovinylarene monomer charges each contain monovinylarene monomer in the range of from about 5 weight percent to about 20 weight percent based on the total weight of the final block copolymer.

14. A method according to claim 1 wherein each said monovinylarene monomer contains 8 to 12 carbon atoms and each said conjugated diene contains 4 to 6 carbon atoms.

15. A method according to claim 1 wherein said conjugated diene monomer is 1,3-butadiene and said monovinylarene monomer is styrene.

16. A monovinylarene/conjugated diene block copolymer comprising;
about 55 to about 95 weight percent polymerized monovinylarene based on the total weight of said copolymer and about 5 to about 45 weight percent polymerized conjugated diene based on the total weight of said copolymer;
said copolymer having polymer chains which result from coupling block copolymer chains $$S_1-S_2-S_3-B_1/S_4-Li_2$$
$$S_2-S_3-B_1/S_4-Li_2$$
$$S_3-B_1/S_4-Li_3$$

wherein
S = monovinylarene block
B = conjugated diene block
B/S = tapered block of conjugated diene and monovinylarene
Li = living polymer site or coupling site.

17. A monovinylarene/conjugated diene block copolymer comprising;
about 55 to about 95 weight percent polymerized monovinylarene based on the total weight of said copolymer and about 5 to about 45 weight percent polymerized conjugated diene based on the total weight of said copolymer;
said copolymer having polymer chains which result from coupling block copolymer chains $$S_1-S_2-S_3-B_1/S_4-B_2/S_5-Li_1$$
$$S_2-S_3-B_1/S_4-B_2/S_5-Li_2$$
$$S_3-B_1/S_4-B_2/S_5-Li_3$$

wherein
S = monovinylarene block
B = conjugated diene block
B/S = tapered block of conjugated diene and monovinylarene
Li = living polymer site or coupling site.

18. A monovinylarene/conjugated diene block copolymer comprising;
about 55 to about 95 weight percent polymerized monovinylarene based on the total weight of said copolymer and about 5 to about 45 weight percent polymerized conjugated diene based on the total weight of said copolymer;
said copolymer having polymer chains which result from coupling block copolymer chains $$S_1-S_2-S_3-S_4-B_1-Li_1$$
$$S_2-S_3-S_4-B_1-Li_2$$
$$S_3-S_4-B_1-Li_3$$

wherein
S = monovinylarene block
B = conjugated diene block
Li = living polymer site or coupling site.

* * * * *

UNITED STATES PATENT AND TRADEMARK OFFICE
CERTIFICATE OF CORRECTION

PATENT NO.     : 5,436,298                                                     Page 1 of 1
DATED          : July 25, 1995
INVENTOR(S)    : George A. Moczygemba, Larry L. Nash, William J. Trepka, Craig D. DePorter,
                 Nathan E. Stacey, Ralph C. Farrar and Charles M. Selman It is certified that error appears in the above-identified patent and that said Letters Patent is hereby corrected as shown below:

Column 33,
Line 37, delete "$Li_2$" and insert -- $Li_1$ --.

Signed and Sealed this

Twenty-ninth Day of October, 2002

Attest:

Attesting Officer

JAMES E. ROGAN
*Director of the United States Patent and Trademark Office*